US010155190B2

United States Patent
Stallmann

(10) Patent No.: US 10,155,190 B2
(45) Date of Patent: Dec. 18, 2018

(54) SYSTEM AND METHOD FOR REDUCING CARBON DIOXIDE EMISSIONS FROM A FLUE GAS

(71) Applicant: GENERAL ELECTRIC TECHNOLOGY GMBH, Baden (CH)

(72) Inventor: Olaf Stallmann, Essenheim (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 100 days.

(21) Appl. No.: 15/298,350

(22) Filed: Oct. 20, 2016

(65) Prior Publication Data

US 2018/0111081 A1 Apr. 26, 2018

(51) Int. Cl.
*B01D 53/02* (2006.01)
*B01D 53/04* (2006.01)
(Continued)

(52) U.S. Cl.
CPC ......... *B01D 53/0438* (2013.01); *B01D 53/62* (2013.01); *B01D 53/83* (2013.01); *B01D 53/96* (2013.01); *B01J 20/3078* (2013.01); *F27B 7/26* (2013.01); *F27B 7/38* (2013.01); *B01D 2251/404* (2013.01); *B01D 2251/602* (2013.01);
(Continued)

(58) Field of Classification Search
CPC ........ B01D 2251/404; B01D 2251/602; B01D 2257/504; B01D 2258/0283; B01D 2259/40098; B01D 2259/655; B01D 53/0438; B01D 53/62; B01D 53/83; B01D 53/96; B01J 20/3078; F27B 2007/266; F27B 7/26; F27B 7/38
See application file for complete search history.

(56) References Cited

U.S. PATENT DOCUMENTS 3,336,104 A * 8/1967 Miller ............... B01J 6/001
423/206.2
4,058,205 A * 11/1977 Reed, Jr. ............ C10B 1/10
201/14
(Continued)

FOREIGN PATENT DOCUMENTS

CN 101655312 B 3/2012
EP 2 959 966 A1 12/2015

OTHER PUBLICATIONS

Extended European Search Report and Opinion issued in connection with corresponding EP Application No. 17197131.0 dated Mar. 22, 2018.

*Primary Examiner* — Christopher P Jones
(74) *Attorney, Agent, or Firm* — Cynthia W. Flanigan; GPO Global Patent Operation

(57) ABSTRACT

A system for reducing carbon dioxide emissions from a flue gas is provided. The system includes a carbonator, and a calciner. The carbonator receives the flue gas and lean sorbent particles such that the lean sorbent particles absorb gaseous carbon dioxide from the flue gas and become loaded sorbent particles. The calciner includes a drum that defines a cavity having a first opening and a second opening. The first opening is fluidly connected to the carbonator such that the loaded sorbent particles flow into the cavity from the carbonator. The drum rotates such that at least some of the loaded sorbent particles are mixed with heat-transferring particles so as to release the absorbed gaseous carbon dioxide and exit the drum via the second opening as lean sorbent particles.

5 Claims, 4 Drawing Sheets

(51) Int. Cl.
  *B01J 20/30* (2006.01)
  *F27B 7/26* (2006.01)
  *F27B 7/38* (2006.01)
  *B01D 53/62* (2006.01)
  *B01D 53/83* (2006.01)
  *B01D 53/96* (2006.01)

(52) U.S. Cl.
  CPC .............. *B01D 2257/504* (2013.01); *B01D 2258/0283* (2013.01); *B01D 2259/40098* (2013.01); *B01D 2259/655* (2013.01); *F27B 2007/266* (2013.01)

(56) References Cited

U.S. PATENT DOCUMENTS

| | | | | |
|---|---|---|---|---|
| 4,474,553 A | * | 10/1984 | Takahashi | F26B 3/205 165/111 |
| 5,423,891 A | * | 6/1995 | Taylor | C10J 3/06 48/197 A |
| 6,419,481 B2 | | 7/2002 | Ahvenainen | |
| 7,771,690 B2 | * | 8/2010 | Vandendoren | C01D 7/126 423/427 |
| 7,896,951 B2 | * | 3/2011 | Andrus, Jr. | B01D 53/62 95/107 |
| 9,573,848 B2 | * | 2/2017 | Balfe | C04B 7/434 |
| 2010/0086456 A1 | * | 4/2010 | Epple | B01D 53/08 423/230 |
| 2010/0329963 A1 | * | 12/2010 | Sceats | B01D 53/62 423/437.1 |
| 2014/0072484 A1 | * | 3/2014 | Gimenez | B01J 8/1836 423/1 |
| 2014/0352581 A1 | * | 12/2014 | Abanades Garcia | F23J 15/02 110/203 |
| 2014/0377713 A1 | | 12/2014 | Devroe et al. | |
| 2015/0157978 A1 | | 6/2015 | Chen et al. | |
| 2015/0368157 A1 | * | 12/2015 | Balfe | C04B 7/434 106/739 |
| 2017/0333829 A1 | * | 11/2017 | Tan | B01D 53/12 |

* cited by examiner

SYSTEM AND METHOD FOR REDUCING CARBON DIOXIDE EMISSIONS FROM A FLUE GAS

BACKGROUND

Technical Field

Embodiments of the invention relate generally to power plant technology and, more specifically, to a system and method for reducing carbon dioxide emissions from a flue gas.

Discussion of Art

Many electrical power plants combust fossil fuels in order to generate heat, which in turn is used to power an electrical generator via a steam turbine. The combustion of fossil fuels, however, generates large amounts of carbon dioxide ("$CO_2$"). Accordingly, due to the increased concern that $CO_2$ may be contributing to global warming, many fossil fuel based power plants now attempt to reduce $CO_2$ emissions by recapturing and storing $CO_2$ via "carbon capture" technologies.

One such technology is a Fully Integrated Regenerative Calcium Cycle ("FIRCC"), which is a post-combustion system that utilizes two reactors, e.g., a carbonator and a calciner. In the carbonator, $CO_2$ from the flue gas reacts with lime, or other carbon absorbing compound, to form limestone. The limestone is then sent to the calciner where it is heated and converted back into lime and $CO_2$ via an endothermic calcination reaction. The $CO_2$ is then captured and stored and the lime is returned back to the carbonator.

Presently, many fossil fuel based plants that implement FIRCC systems utilize calciners that rely on a transport gas, e.g., flue gas, to mix the limestone with heat-transferring particles that heat the limestone within the calciner. Many such calciners, however, typically do not achieve an optimal mixing of the heat-transferring particles with the limestone, which in turn, may reduce the efficiency of the calciner with respect to converting the limestone back into lime and $CO_2$. Moreover, many such calciners are not hermetically sealed, and therefore, leak limestone, heat-transferring particles, and/or $CO_2$, which in turn may also decreases the efficiency of the calciner with respect to converting the limestone back into lime and $CO_2$, and/or the efficiency of the FIRCC system as a whole. Additionally, such non-hermetically sealed calciners may also have high air ingresses which, as used herein, refers to the amount of air entering into the calciner from the environment surrounding the calciner.

In view of the above, what is needed is an improved system and method for reducing carbon dioxide emissions from a flue gas.

BRIEF DESCRIPTION

In an embodiment, a system for reducing carbon dioxide emissions from a flue gas is provided. The system includes a carbonator, and a calciner. The carbonator receives the flue gas and lean sorbent particles such that the lean sorbent particles absorb gaseous carbon dioxide from the flue gas and become loaded sorbent particles. The calciner includes a drum that defines a cavity having a first opening and a second opening. The first opening is fluidly connected to the carbonator such that the loaded sorbent particles flow into the cavity from the carbonator. The drum rotates such that at least some of the loaded sorbent particles are mixed with heat-transferring particles so as to release the absorbed gaseous carbon dioxide and exit the drum via the second opening as lean sorbent particles.

In another embodiment, a calciner is provided. The calciner includes a drum and an outer shell. The drum defines a cavity having a first opening and a second opening. The first opening is configured to allow loaded sorbent particles to flow into the cavity. The outer shell is disposed around the drum and hermetically seals the drum so as to define a channel between the outer shell and the drum. The drum rotates such that at least some of the loaded sorbent particles are mixed with heat-transferring particles so as to release gaseous carbon dioxide and exit the drum via the second opening as lean sorbent particles. At least some of the released carbon dioxide is circulated as a gas through the channel so as to cool the drum.

In yet another embodiment, a gear ring for a rotating drum of a calciner is provided. The gear ring includes a body and a first channel. The body is configured to be disposed on an outside of the rotating drum. The first channel is defined by the body. When the gear ring is disposed on the outside of the rotating drum, the first channel aligns with a second channel, defined by the rotating drum and an outer shell of the calciner, such that a cooling medium is allowed to flow through the first channel and the second channel to cool at least one of the rotating drum and the gear ring.

In yet still another embodiment, a method for reducing carbon dioxide emissions from a flue gas is provided. The method includes: converting lean sorbent particles into loaded sorbent particles by absorbing carbon dioxide from the flue gas in a carbonator; receiving the loaded sorbent particles from the carbonator at a first opening of a cavity of a drum of a calciner; rotating the drum so as to mix the loaded sorbent particles with heat-transferring particles within the cavity such that the loaded sorbent particles release absorbed carbon dioxide as a gas and revert back to lean sorbent particles; and transporting the reverted lean sorbent particles to the carbonator.

DRAWINGS

The present invention will be better understood from reading the following description of non-limiting embodiments, with reference to the attached drawings, wherein below:

DETAILED DESCRIPTION

Figure 1:
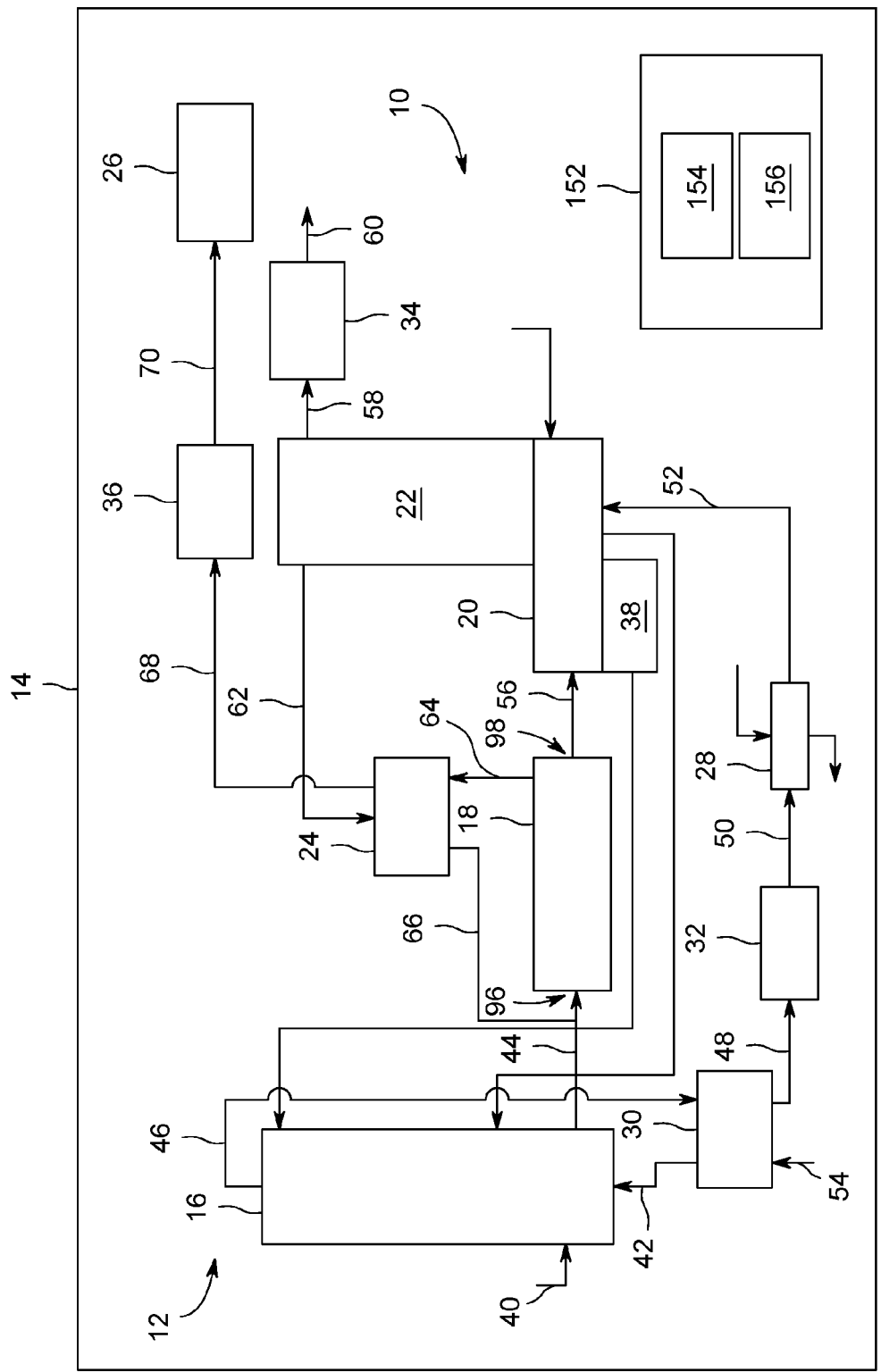
FIG. 1 is a diagram of an exemplary system for reducing carbon emissions from a flue gas in accordance with an embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. The term "real-time," as used herein, means a level of processing responsiveness that a user senses as sufficiently immediate or that enables the processor to keep up with an external process. As used herein, "electrically coupled", "electrically connected", and "electrical communication" mean that the referenced elements are directly or indirectly connected such that an electrical current, or other communication medium, may flow from one to the other. The connection may include a direct conductive connection, i.e., without an intervening capacitive, inductive or active element, an inductive connection, a capacitive connection, and/or any other suitable electrical connection. Intervening components may be present.

As also used herein, the term "fluidly connected" means that the referenced elements are connected such that a fluid (to include a liquid, gas, and/or plasma) may flow from one to the other.

Accordingly, the terms "upstream" and "downstream," as used herein, describe the position of the referenced elements with respect to a flow path of a fluid and/or gas flowing between and/or near the referenced elements.

Additionally, as used herein, the term "fill" includes both fully and partially filling a containing object with a filling material or object.

As also used herein, the term "heating-contact" means that the referenced objects are in proximity of one another such that heat/thermal energy can transfer between them.

Accordingly, the term "cooling medium," as used herein, means any substance that when brought into heating-contact with an object absorbs thermal energy from the object so as to reduce the temperature of the object.

The term "stream," as used herein, refers to the sustained movement of a substance, e.g., a gas and/or liquid.

Further, the term "sorbent," as used herein, refers to a substance capable of absorbing and/or releasing $CO_2$.

Thus, the terms "lean" and "$CO_2$-lean," as used herein with respect to a sorbent, describe the state of the sorbent when stripped of previously absorbed $CO_2$, and the terms "loaded" and "$CO_2$-rich," as used herein with respect to a sorbent, describe the state of the sorbent when containing absorbed $CO_2$.

Similarly, the terms "lean," and "$CO_2$-lean," as used herein with respect to a gas and/or a stream, mean that the gas or stream has a low amount, or no amount, of $CO_2$, and the terms "loaded" and "$CO_2$-rich," as used herein with respect to a gas and/or stream, mean that the gas or stream has a high amount of $CO_2$.

A such, while the embodiments disclosed herein are described with respect to fossil fuel based power plants, e.g., coal and oil based power plants, that utilize carbonators and calcination reactions, it is to be understood that embodiments of the present invention are equally applicable to any device and/or process in which a compound and/or element must be captured from a containing substance via a sorbent and a calcination process.

Accordingly, referring to FIG. 1, a system 10 that utilizes an FIRCC 12 for reducing carbon dioxide emissions from a flue gas is shown. As will be appreciated, the system 10 utilizing the FIRCC 12 may be fully integrated into a power plant 14. Accordingly, in embodiments, the power plant 14 includes a particle heating furnace 16, a calciner 18 having a calcination chamber, a classifier 20, a carbonator 22, a sorbent preheater 24, $CO_2$ compression equipment 26, a desulfurization unit 28, an air preheater 30, and/or one or more heat recovery components 32, 34, 36, 38.

As is to be understood, the above elements of the system 10 may include auxiliary equipment associated with their respective primary functions. For example, the carbonator 22 may include one or more cyclones, loop seals and internal heat transfer equipment.

It is further to be understood that additional equipment of the power plant 14, typically associated with a coupled steam cycle and power generation, has not been explicitly shown in the drawings for the purpose of improving clarity.

Further still, while the drawings and specification herein discuss and show heat being transferred to the coupled steam cycle, e.g., heat recovery components 32, 34, 36, 38, it is to be further understood that heat transfer to the steam cycle may also occur in other components and/or process steps not explicitly labeled "heat recovery."

As shown in FIG. 1, the particle heating furnace 16 produces/generates a flue gas via combusting coal (or other fossil fuels) with air received via conduits 40 and 42, respectively. As will be appreciated, the particle heating furnace 16 increases the temperature of heat-transferring particles (not shown and also referred to hereinafter as "HT particles") which are sent to the calciner 18 via conduit 44 to drive a high temperature endothermic calcination reaction. As will be appreciated, in embodiments, the HT particles may be inert compounds/elements.

Further, partially cooled flue gas exits the particle heating furnace 16 via conduits 46 and 48 and may be cooled by heat recovery component 32 before entering the desulfurization unit 28 via conduit 50. After having a bulk amount of sulfur removed via the desulfurization unit 28, the flue gas, which may then be exposed/come into contact with a plurality of carbon absorbing particles (hereinafter also referred to as "sorbent" and "sorbent particles"), flows to the classifier 20 and the carbonator 22 via conduit 52.

In embodiments, the air preheater 30 may receive the air, via conduit 54, and then heat the air prior to combustion in the particle heating furnace 16. In embodiments, the air preheater 30 may heat the air via cooling the flue gas received from the particle heating furnace 16 via conduit 46.

The classifier 20 may be fluidly connected to and upstream of the carbonator 22 and receives flue gas via conduit 52. The classifier 20 may also be fluidly connected to and downstream of the calciner 18 via conduit 56 through which a mixture of lean sorbent and HT particles flow from the calciner 18 to the classifier 20.

As will be appreciated, in embodiments, the classifier 20 utilizes the flow of flue gas to separate lean sorbent from the HT particles due to differences in diameter and density between the molecules of the sorbent and HT particles.

The carbonator 22 may be fluidly connected to and downstream of the classifier 20. The carbonator 22 receives flue gas and entrained sorbent from the classifier 20. It is within the carbonator 22 that the lean sorbent absorbs $CO_2$ from the flue gas so as to form a $CO_2$-rich sorbent stream and a $CO_2$-lean flue gas stream. As will be appreciated, the $CO_2$-rich sorbent stream and the $CO_2$-lean flue gas stream may be generated via a cyclone (not shown).

The CO2-lean flue gas stream then exits the carbonator 22 via conduit 58 where it is further processed (heat is removed/recovered) by heat recovery component 34 prior to being emitted to the atmosphere via conduit 60. The $CO_2$-rich sorbent stream exits the carbonator 22 via conduit 62 and is forwarded to the sorbent preheater 24.

The sorbent preheater 24 is used to preheat loaded sorbent with hot $CO_2$ from the calciner 18 via conduit 64 before the loaded sorbent is fed via conduit 66 to the calciner 18.

The calciner 18 is fluidly connected with the particle heating furnace 16 and fed with heated HT particles via conduit 44. Thus, the calciner 18 receives the HT particles and the loaded sorbent so as to form a mixture including both the HT particles and the sorbent, i.e., the loaded sorbent is brought into heating-contact with the HT particles within the calciner 18. As will be appreciated, and as shown in FIG. 1, in embodiments, conduit 66 may join conduit 44 upstream of the calciner 18 such that the loaded sorbent mixes with the HT particles prior to flowing into the calciner 18. It is also to be appreciated, however, that in other embodiments, the HT particles and the loaded sorbent may flow into the calciner 18 via separate paths/conduits.

Mixing the HT particles with the loaded sorbent within the calciner 18 triggers the release of the absorbed $CO_2$ via an endothermic calcination reaction. Specifically, during the endothermic calcination reaction, heat is transferred from the HT particles to the loaded sorbent which causes the loaded sorbent to unload/release the absorbed $CO_2$, thus, transitioning the loaded sorbent back into lean sorbent.

The released $CO_2$ gas stream is then transferred via conduit 64 to the sorbent preheater 24 where it is cooled, via heating of the loaded sorbent, further cooled via conduit 68 and heat recovery component 36, and further processed by the $CO_2$ compression equipment 26 via conduit 70 in preparation for storage and/or transportation via a tank or other appropriate $CO_2$ containing vessels.

Figure 2:
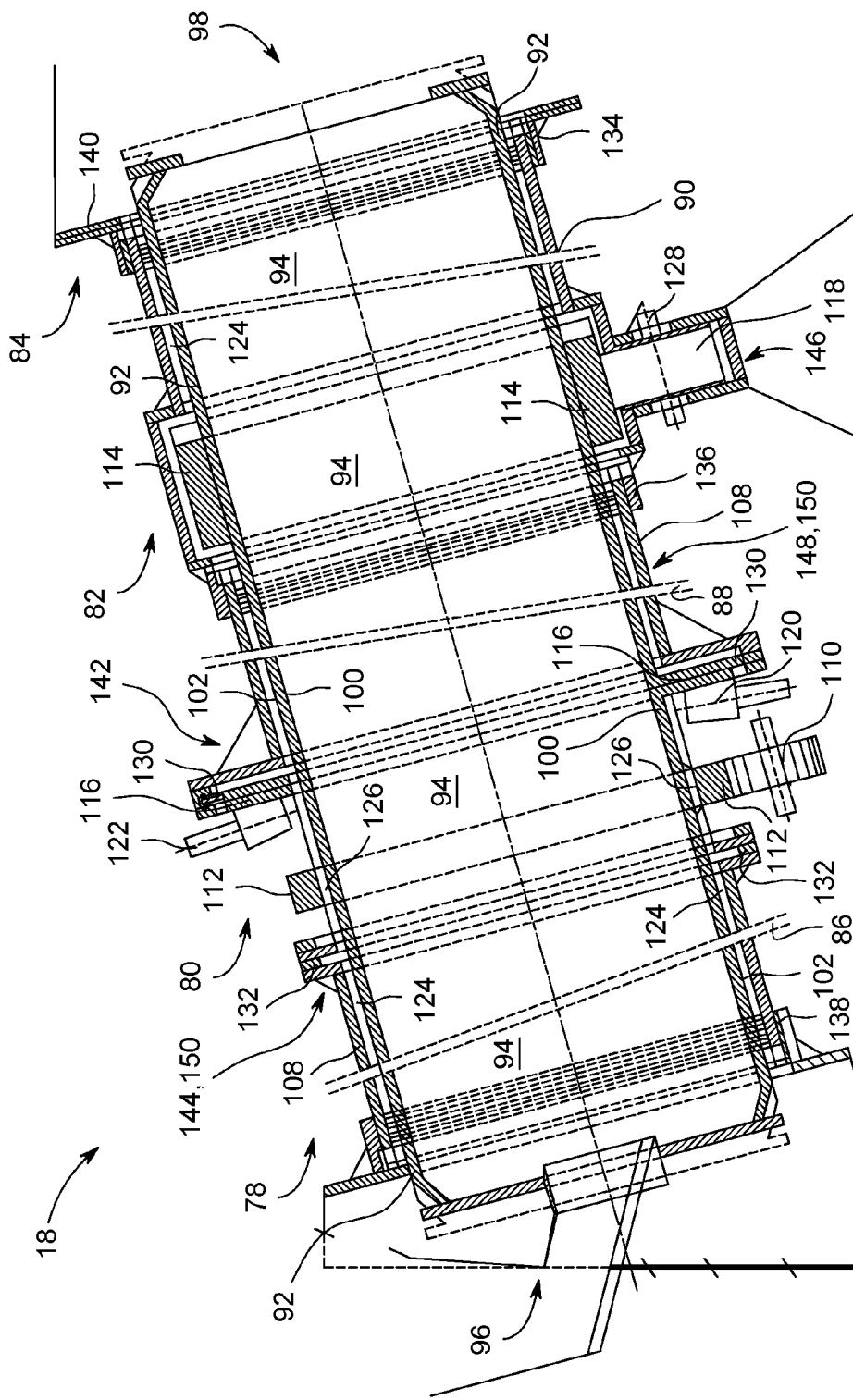
FIG. 2 is a schematic diagram of a calciner of the system of FIG. 1 in accordance with an embodiment of the present invention.

Turning now to FIG. 2, an embodiment of the calciner 18 in accordance with the present invention is shown. As will be appreciated, the calciner 18 may have a length of thirty (30) or more meters. Therefore, for the purpose of clarity, the calciner 18 has been depicted as having a front segment 78, a first middle segment 80, a second middle segment 82, and an end segment 84 as defined by the dashed lines 86, 88, and 90. While FIG. 2 depicts the segments 78, 80, 82, and 84 as being discontinuous, i.e., segments 78, 80, 82, and 84 are shown as being broken apart from one another by lines 86, 88, and 90, it is to be understood that in actuality segments 78, 80, 82, and 84 are continuous with one another.

As shown in FIG. 2, the calciner 18 includes a drum 92 that defines a cavity/calcination chamber 94 having a first opening 96 and a second opening 98. The first opening 96 may be fluidly connected to the carbonator 22 via conduits 44, 62, and 66 (FIG. 1) such that the loaded sorbent particles and the HT particles flow into the cavity 94. The drum 92 has an inside 100 and an outside 102. The drum 92 rotates such that at least some of the loaded sorbent particles are mixed with the HT particles, i.e., the HT particles are brought into heating-contact with the loaded sorbent particles so as to cause an endothermic reaction wherein the sorbent particles convert/revert back into lean sorbent particles by absorbing thermal energy from the HT particles and releasing absorbed $CO_2$ (g) in exchange. The lean sorbent particles and the HT particles then exit the calciner 18 via the second opening 98 and flow to the classifier 20 and/or carbonator 22 via conduit 56 (FIG. 1).

Figure 3:
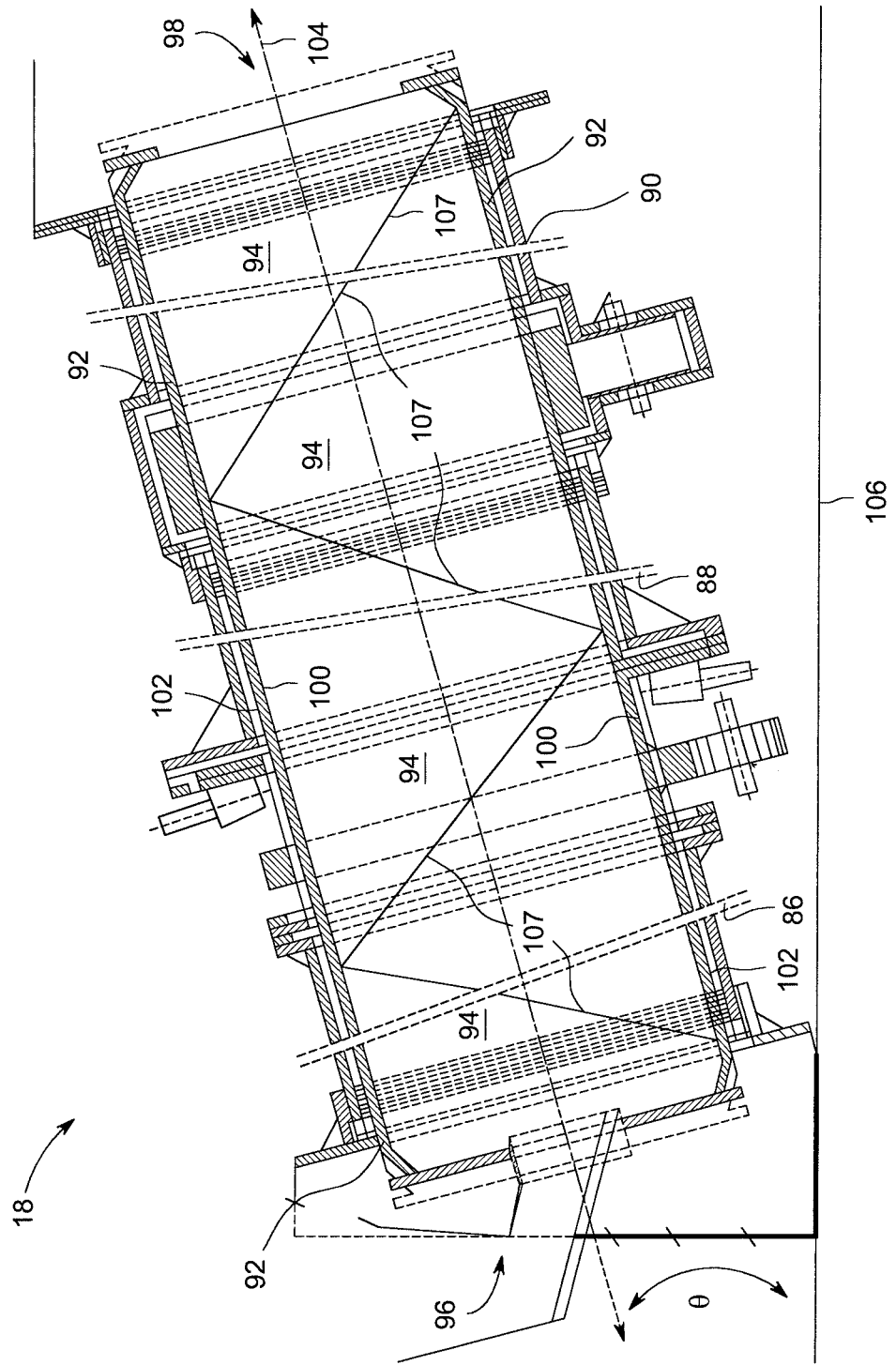
FIG. 3 is another schematic diagram of the calciner of the system of FIG. 1 in accordance with an embodiment of the present invention.

Referring briefly to FIG. 3, as will be appreciated, in embodiments, the drum 92 may be arranged/disposed along an incline depicted as the angle θ between a longitudinal axis 104 of the drum 92 and a surface 106 that supports the calciner 18/drum 92. As shown in FIG. 3, the longitudinal axis 104 runs along the length of the calciner 18. Further, in embodiments, θ may be (0-20°). Accordingly, the inside 100 of the drum 92 may have shaped spiraling fins 107 that form an Archimedes screw. In such embodiments, the sorbent particles and the HT particles are mixed and transported from the first opening 96 to the second opening 98 up the incline, via the fins 107, as the drum 92 rotates.

Thus, as will be appreciated, some embodiments of the present invention may separate the lean sorbent particles and HT particles via hydraulic resistance and/or gravity via an uplift gas stream. In other words, in addition to the released $CO_2$ (g) from the sorbent, an uplift gas stream may be introduced into the cavity 94 so as to move through the cavity 94 and carry away the lighter lean sorbent particles, while the heavier loaded sorbent and HT particles remain behind on the fins 107.

Referring back to FIG. 2, in embodiments, the calciner 18 may further include an outer shell/casing 108 disposed around the outside 102 of the drum 92. The outer shell 108 may remain stationary in relation to the drum 92 as the drum 92 rotates, and may also hermetically seal the drum 92, i.e., the outer shell 108 restricts and/or prevents the movement of air between the cavity 94 and the environment/atmosphere surrounding the calciner 18.

As further shown in FIG. 2, the calciner 18 may include a driver/motor gear 110 that interlocks with a gear ring 112 disposed on the outside 102 of the drum 92, a y-carrier ring 114 and an x-carrier ring 116 also disposed on the outside of the drum 92, and one or more bear wheels 118, 120, 122 that serve as fixation/support points for the calciner 18. For example, in embodiments, bear wheel 118 may be disposed against the y-carrier ring 114, and bear wheels 120 and 122 may be disposed against the x-carrier ring 116. Accordingly, the driver/motor gear 110 provides the rotation force to rotate the drum 92, while bear wheel 118 provides the support necessary to keep the drum 92 inclined, and bear wheels 120 and 122 prevent sliding of the drum 92 along the axis (104 in FIG. 3) due to gravitational forces.

As will be appreciated, in embodiments, the drum 92 may reach temperatures greater than or equal to 900° C., which in turn may cause thermal expansion of the drum 92 within the outer shell 108. For example, in some embodiments, the thermal expansion of the drum 92 may be as much as 1520 cm. Thus, some embodiments of the invention may implement one or more features that provide for the outer shell 108 to maintain an adequate hermetic seal during expansion and contraction of the drum 92 while minimizing and/or eliminating air ingress.

Figure 4:
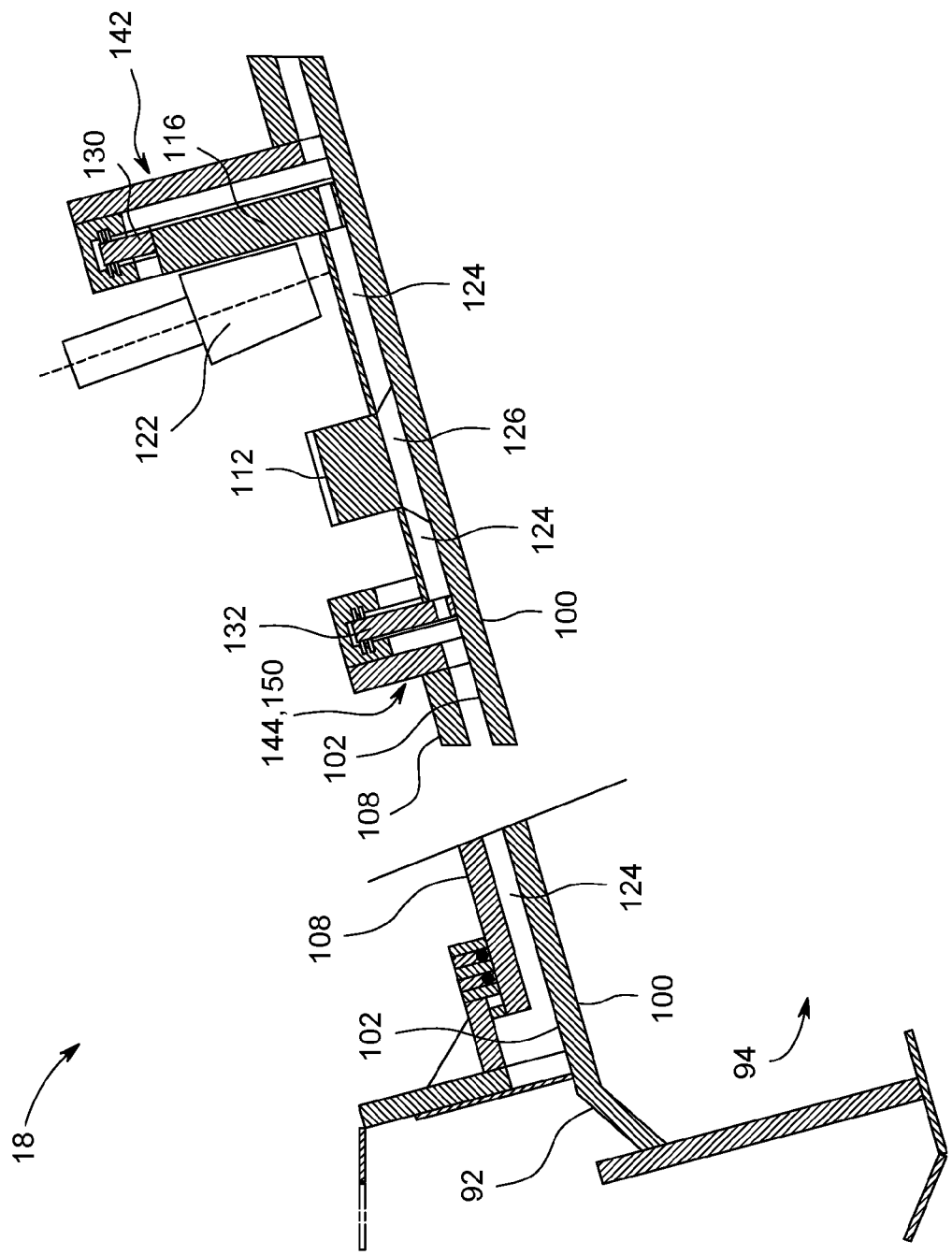
FIG. 4 is schematic diagram of channels defined by an outer shell and a drum of the calciner of FIG. 1 in accordance with an embodiment of the present invention.

For example, as illustrated in FIG. 4, in embodiments, the outer shell 108 and the drum 92 may define one or more channels 124 through which a cooling medium may flow so as to cool the drum 92. In such embodiments, the cooling medium may cool the outside 102 of the drum 92 to a temperature at or between 300° C. and 500° C. As will be appreciated, the cooling medium may be circulated/recirculated gaseous $CO_2$ that requires heating prior to being utilized as a transport gas for the lean sorbent particles. For example, in embodiments, the $CO_2$ gas released from the sorbent within the cavity 94 may be collected from a gas stream leaving the cavity 94 and introduced into the channels 124 such that the $CO_2$ is allowed to flow along the outside 102 of the drum 92. In such embodiments, the $CO_2$ may be sent through a cyclone (not shown) to remove any impurities/contaminants, e.g., dust, prior to being sent to the channels 124.

Further, while the one or more channels 124 are depicted in the accompanying drawings as a single space 124 between the outer shell 108 and the outside 102 of the drum 92, in other embodiments, the outer shell 108 and the drum 92 may define two or more channels 124. In yet still other embodiments, the channels 124 may be carved out of either the outer shell 108 and/or the outside 102 of the drum 92. As will be appreciated, in embodiments, the channels 124 may span all, or most, of the length of the drum 92 (best seen in FIGS. 2 and 3).

Additionally, in embodiments, the gear ring 112 may include channels 126 that align with the channels 124 defined by the outer shell 108 and the drum 92, i.e., channels 124 and 126 are arranged such that they are fluidly connected to each other so that the cooling medium may flow from the channels 124, defined by the outer shell 108 and the drum 92, to the channels 126 of the gear ring 112 so as to cool the drum 92 and/or the gear ring 112.

As is to be appreciated, cooling the outside 102 of the drum 92 and/or the gear ring 112 via $CO_2$ flowing through the channels 124 and/or 126, reduces thermal expansion of the drum 92 and/or the gear ring 112. Moreover, in some embodiments, the hermetic sealing of the drum 92 via the outer shell 108 allows the $CO_2$ to be circulated/recirculated over the outside 102 of the drum 92 such that the calciner 18 has little or no air ingress. In such embodiments, the cooling medium may be approximately 100% $CO_2$.

Referring back to FIG. 2, the calciner 18 may also include one or more double seal rings 128, 130, and 132, and/or one or more packed expansion joints 134, 136, and 138, disposed between the drum 92, the outer shell 108, and/or an internal seal plate 140 also disposed between the outer shell 108 and the drum 92.

In embodiments, the double seal rings 128, 130, and 132 may be disposed near one or more of the gear ring 112 and/or the bear wheels 118, 120, 122 so as to minimize the effects of the thermal expansion of the drum 92.

As will be understood, in embodiments, the packed expansion joins 134, 136, and 138 move, e.g., expand and contract, so as to allow the outer shell 108 to remain connected/attached to the drum 92 during thermal expansion of the drum 92 such that the hermetic seal between the outer shell 108 and the drum 92 is maintained. Thus, as will be appreciated, the packed expansion joints 134, 136, and 138 allow the outer shell 108 to adjust to the thermal expansion of the drum 92 while maintaining a hermetic seal.

The calciner 18 may further include one or more purge gas connections 142, 144, 146, 148 disposed at various locations within the calciner 18 so as to prevent the deposit/buildup of solids at critical areas of the calciner 18, e.g., along the outside 102 of the drum 92. In embodiments, the purge gas may be the $CO_2$ released by the sorbent in the cavity 94. Additionally, the calciner 18 may further include one or more cooling connections 150 to input the cooling medium into the channels 124, 126 and/or to deliver the cooling medium to other components of the calciner 18.

Thus, in operation, according to embodiments of the invention, the system 10 may be utilized to perform a method for reducing $CO_2$ emissions from a flue gas. For example, the method may include converting lean sorbent particles into loaded sorbent particles by absorbing $CO_2$ from the flue gas in the carbonator 22, and then receiving the loaded sorbent particles at the first opening 96 of the cavity 94 of the drum 92 such that the loaded sorbent particles flow into the cavity 94. The drum 92, which as stated above may be inclined, is then be rotated, thus mixing the loaded sorbent particles with HT particles to facilitate the conversion of the loaded sorbent particles into lean sorbent particles via the release of the absorbed $CO_2$. As also stated above, in embodiments wherein the drum 92 is inclined, the rotation of the drum 92 may transport the loaded sorbent particles and HT particles up the incline via the fins 107.

Additionally, in embodiments, the method may include hermetically sealing the drum 92 via the outer shell 108 in the manner discussed above, and/or cooling the drum 92 via the cooling medium, channels 124, 126, and/or cooling connections 150, so as to mitigate the effects of any expansion that the drum 92 may undergo.

Further, in embodiments, the method may include separating the lean sorbent particles from the HT particles by hydraulic resistance and/or gravity via an uplift gas stream as also discussed above.

Further still, the method may include transporting the lean sorbent particles to the carbonator 22 for reuse.

Finally, it is also to be understood that the system may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein.

For example, as shown in FIG. 1, the system 10 may include a controller 152 having at least one processor 154, and system memory/data storage structures 156, which may include random access memory (RAM) and read-only memory (ROM). The at least one processor of the 154 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a carbon reducing application, that adapts the controller 152 to perform the various methods described herein, may be read into a main memory of the at least one processor 154 from a computer-readable medium. The term "computer-readable medium," as used herein, refers to any medium that provides or participates in providing instructions to the at least one processor of the 154 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes the at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment a system for reducing carbon dioxide emissions from a flue gas is provided. The system includes a carbonator, and a calciner. The carbonator receives the flue gas and lean sorbent particles such that the lean sorbent particles absorb gaseous carbon dioxide from the flue gas and become loaded sorbent particles. The calciner includes a drum that defines a cavity having a first opening and a second opening. The first opening is fluidly connected to the carbonator such that the loaded sorbent particles flow into the cavity from the carbonator. The drum rotates such that at least some of the loaded sorbent particles are mixed with heat-transferring particles so as to release the absorbed gaseous carbon dioxide and exit the drum via the second opening as lean sorbent particles. In certain embodiments, the drum is inclined. In certain embodiments, the calciner includes an outer shell disposed around the drum so as to hermetically seal the drum. In certain embodiments, the outer shell and the drum define one or more channels through which a cooling medium may flow so as to cool the drum. In certain embodiments, the cooling medium includes the released gaseous carbon dioxide. In certain embodiments, the calciner further includes a gear ring that is disposed on an outside of the drum and includes a channel that aligns with the one or more channels defined by the outer shell and the drum. In certain embodiments, the calciner further includes one or more purge gas connections disposed between the outer shell and the drum.

Other embodiments provide for a calciner. The calciner includes a drum and an outer shell. The drum defines a cavity having a first opening and a second opening. The first opening is configured to allow loaded sorbent particles to flow into the cavity. The outer shell is disposed around the drum and hermetically seals the drum so as to define a channel between the outer shell and the drum. The drum rotates such that at least some of the loaded sorbent particles are mixed with heat-transferring particles so as to release gaseous carbon dioxide and exit the drum via the second opening as lean sorbent particles. At least some of the released carbon dioxide is circulated as a gas through the channel so as to cool the drum. In certain embodiments, the drum is inclined. In certain embodiments, the calciner further includes one or more double seal rings disposed between the drum and the outer shell. In certain embodiments, the calciner further includes one or more packed expansion joints disposed between the drum and the outer shell. In certain embodiments, the calciner further includes a gear ring that is disposed on an outside of the drum and includes a channel that aligns with the channel defined by the outer shell and the drum. In certain embodiments, the calciner includes one or more purge gas connections disposed between the outer shell and the drum.

Yet still other embodiments provide for a gear ring for a rotating drum of a calciner. The gear ring includes a body and a first channel. The body is configured to be disposed on an outside of the rotating drum. The first channel is defined by the body. When the gear ring is disposed on the outside of the rotating drum, the first channel aligns with a second channel, defined by the rotating drum and an outer shell of the calciner, such that a cooling medium is allowed to flow through the first channel and the second channel to cool at least one of the rotating drum and the gear ring. In certain embodiments, the rotating drum is inclined and hermetically sealed by the outer shell.

Yet still other embodiments provide for a method for reducing carbon dioxide emissions from a flue gas. The method includes: converting lean sorbent particles into loaded sorbent particles by absorbing carbon dioxide from the flue gas in a carbonator; receiving the loaded sorbent particles from the carbonator at a first opening of a cavity of a drum of a calciner; rotating the drum so as to mix the loaded sorbent particles with heat-transferring particles within the cavity such that the loaded sorbent particles release absorbed carbon dioxide as a gas and revert back to lean sorbent particles; and transporting the reverted lean sorbent particles to the carbonator. In certain embodiments, the drum is inclined. In certain embodiments, the method further includes separating the lean sorbent particles from the heat-transferring particles by at least one of hydraulic resistance or gravity via an uplift gas stream. In certain embodiments, the method further includes hermetically sealing the drum via an outer shell disposed around the drum. In certain embodiments, the method further includes cooling the drum via a cooling medium flowing through one or more channels defined by the outer shell and the drum.

Accordingly, by utilizing a rotating drum, some embodiments of the invention provide for better mixing of the HT particles and sorbent within the calciner. In particular, some embodiments, which include fins that form an Archimedes screw that transports the HT particles and the sorbent particles up an inclined rotating drum, provide for the ability to separate the HT particles from the sorbent particles via hydraulic resistance and/or gravity using an uplift gas stream. Thus, some embodiments remove the need for a separate classifier in a FIRCC system.

Moreover, some embodiments that include an outer shell that hermetically seals the drum may reduce the amount of heat/thermal energy lost from the system to the surrounding environment/atmosphere.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method for reducing carbon dioxide emissions from a flue gas, the method comprising:
    converting lean sorbent particles into loaded sorbent particles by absorbing carbon dioxide from the flue gas in a carbonator;
    receiving the loaded sorbent particles from the carbonator at a first opening of a cavity of a drum of a calciner;
    rotating the drum so as to mix the loaded sorbent particles with heat-transferring particles within the cavity such that the loaded sorbent particles release absorbed carbon dioxide as a gas and revert back to lean sorbent particles; and
    transporting the reverted lean sorbent particles to the carbonator.

2. The method of claim 1, wherein the drum is inclined.

3. The method of claim 1, wherein the method further comprises:
    separating the lean sorbent particles from the heat-transferring particles by at least one of hydraulic resistance or gravity via an uplift gas stream.

4. The method of claim 1, wherein the method further comprises:
    hermetically sealing the drum via an outer shell disposed around the drum.

5. The method of claim 4, wherein the method further comprises:
    cooling the drum via a cooling medium flowing through one or more channels defined by the outer shell and the drum.

* * * * *